April 27, 1954   R. E. SHEEHE   2,676,330
COMBINATION OVERFLOW AND VALVE ASSEMBLY FOR FLUSH TANKS
Filed March 1, 1952
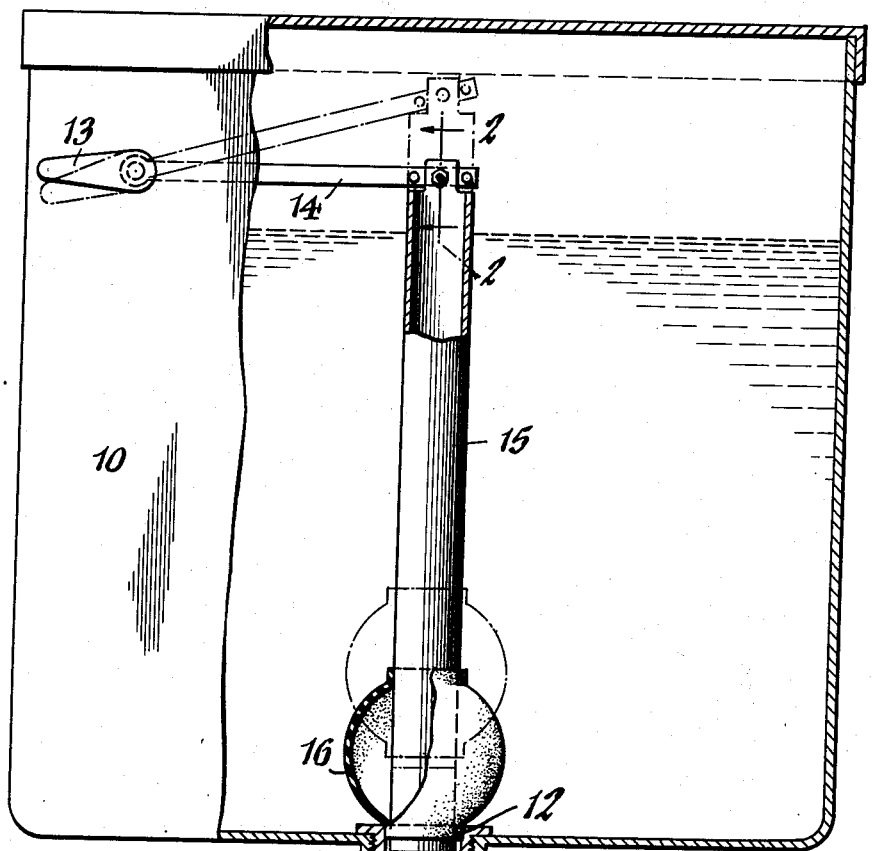
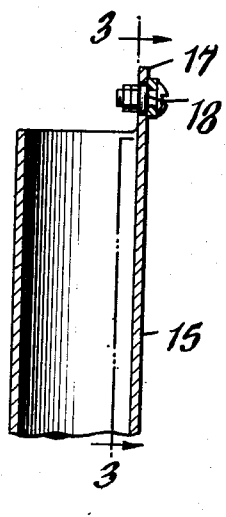
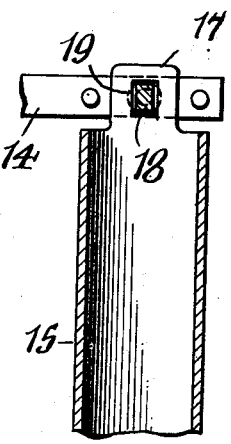
INVENTOR
Robert E. Sheehe
BY
ATTORNEY Patented Apr. 27, 1954

2,676,330

UNITED STATES PATENT OFFICE 2,676,330

COMBINATION OVERFLOW AND VALVE ASSEMBLY FOR FLUSH TANKS

Robert E. Sheehe, Buffalo, N. Y.

Application March 1, 1952, Serial No. 274,399

1 Claim. (Cl. 4—58)

This invention relates generally to controls for closet flushing tanks but more particularly to improvements in the overflow and float valve construction thereof.

One of its objects is to so design a control of this character as to eliminate many of the parts now commonly used in flush tank construction and to that end embody the overflow pipe and flush control float valve into a single unit or assembly which can be readily installed in any type of flush tank and which is simple and inexpensive and made of non-critical materials.

Another object of the invention is to provide a unitary overflow and tank ball valve which is positive and dribble-free in operation and whereby the ball valve seat can be located close to the bottom of the tank and the latter made smaller in its overall dimensions.

Other features of the invention reside in the construction and arrangement of parts hereinafter described and particularly pointed out in the appended claim.

In the accompanying drawings:

Figure 1 is a fragmentary sectional elevational view of a flush tank showing my improved control unit in operative relation thereto. Figure 2 is an enlarged fragmentary cross section taken on line 2—2, Figure 1. Figure 3 is a vertical section taken on line 3—3, Figure 2.

Similar characters of reference indicate corresponding parts throughout the several views.

Referring now to the drawings, 10 indicates the flush tank or reservoir of a water closet having a drain pipe 11 depending from its bottom for discharging communication therewith and terminating or provided at its upper end and within the tank is a valve seat 12. Journaled in the front wall of the tank is a flushing lever including an outer operating handle 13 and an inner actuating arm 14 in operative governing relation to my improved overflow and tank ball valve unit.

In its preferred construction, my overflow and tank ball valve is a unitary assembly consisting of a vertically-displaceable pipe or tube 15 made of a plastic or other lightweight non-metallic, non-corrosive material which constitutes the overflow pipe, opening and communicating at its lower end with the drain pipe in axial relation thereto and opening at its upper end above the water line of the tank where it is adapted to communicate with the outlet end of the customary dribble pipe, now shown. Adjacent its lower end this overflow pipe has a ball or float valve 16 secured in axial relation thereto which is adapted to normally engage the drain pipe valve seat 12 to shut off the discharge of water from the tank. This float valve is preferably made of rubber and is of hollow spherical shape. At its upper end the overflow pipe has a suspension lug 17 for joining it by a pivot pin 18 to the free end of the actuating arm 14 of the flushing lever, so that upon actuating the latter by the operating handle 13 the overflow pipe is elevated and its ball valve 16 is unseated from the drain pipe to cause the discharge of the water from the flush tank, the overflow pipe and its ball valve remaining in a floating condition until the tank is drained, at which time the valve again seats itself.

To prevent undue swaying of the suspended overflow pipe and ball valve and yet permit sufficient movement thereof to effect a self-seating of such valve on the drain pipe seat 12, the shank of the pivot pin 18 is square or rectangular in cross section and the receiving opening 19 in the pipe suspension lug is of like shape but slightly larger to permit a limited but free movement of the pipe on the pin.

While manifestly simple and inexpensive in construction, this flush tank valve unit dispenses with a separate overflow pipe and its usual fittings, it can be readily applied to flush tanks now in use, and it is positive and reliable in operation and is made of lightweight and non-critical materials.

I claim as my invention:

A combined overflow and valve assembly for flush tanks having a discharge and a valve seat therefor, comprising an overflow pipe of a non-metallic material suspended in the tank in axial relation to its valve seat and completely free from contacting relation with any surface between its upper and lower ends and opening at its lower end into said discharge and at its upper end above the water line of the tank, a spherical-shaped float valve secured to said overflow pipe adjacent the lower end thereof for engagement with said discharge seat, the upper end of the overflow pipe having a suspension lug rising therefrom, an actuating lever journaled in said tank, and an operative connection between said lever and said pipe-lug consisting of a centrally-disposed transverse pivot pin having a shank of substantially square cross section and an opening in such pipe-lug of like shape but slightly larger to permit a limited free movement of the overflow pipe for valve-alining purposes.

References Cited in the file of this patent

UNITED STATES PATENTS

| Number | Name | Date |
| --- | --- | --- |
| 210,515 | Foley | Dec. 3, 1878 |
| 1,102,870 | Carreyn | July 7, 1914 |
| 1,638,395 | Haas | Aug. 9, 1927 |
| 1,889,626 | Bell | Nov. 29, 1932 |
| 2,444,958 | Smith | July 13, 1948 |
| 2,520,574 | Smith | Aug. 29, 1950 |
| 2,579,766 | Smith | Dec. 25, 1951 |